United States Patent Office 3,381,968
Patented May 7, 1968

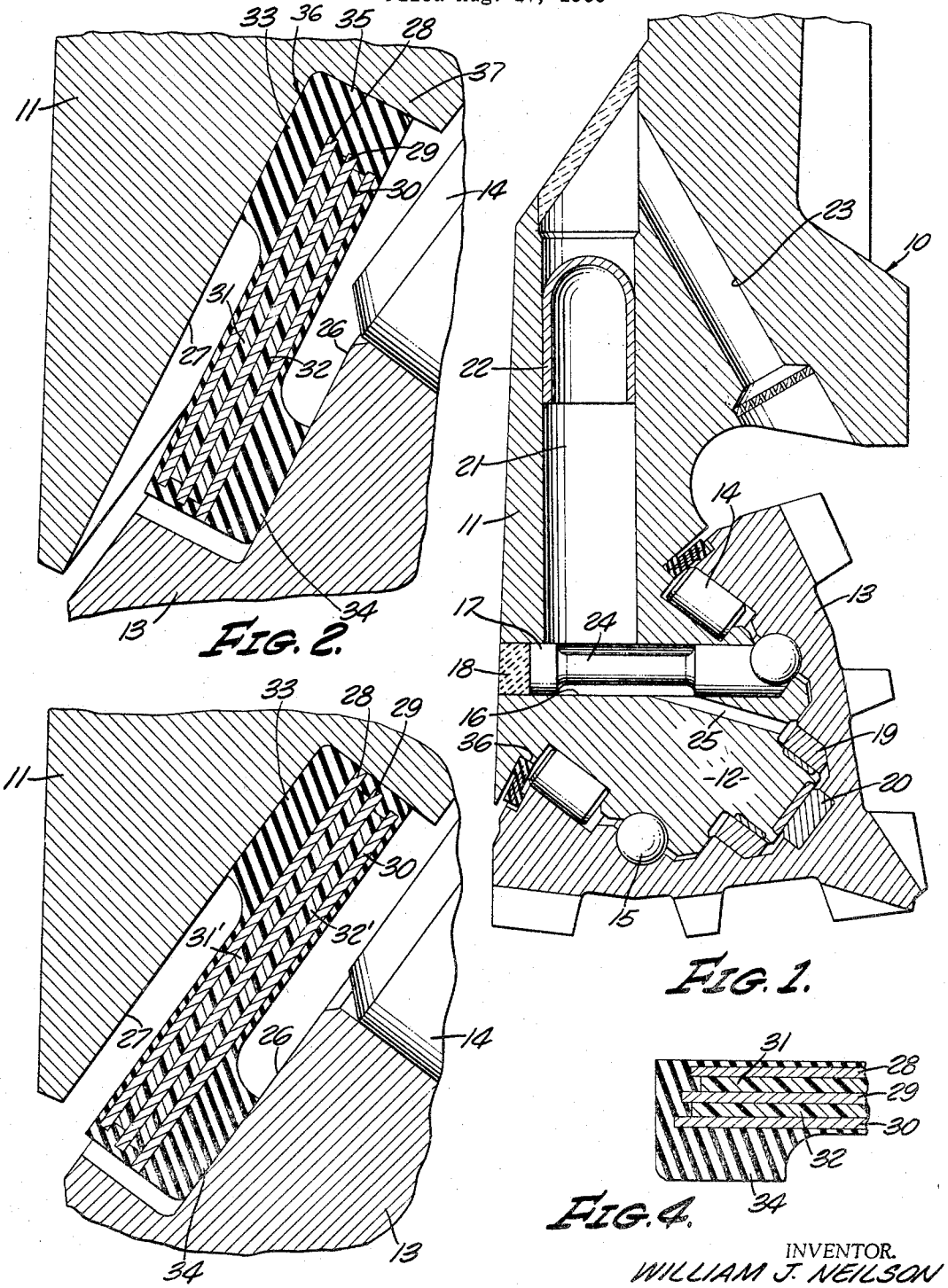

3,381,968
BEARING SEAL
William J. Neilson, Whittier, Calif., assignor to Smith Industries International, Inc., Compton, Calif., a corporation of California
Filed Aug. 17, 1965, Ser. No. 480,439
3 Claims. (Cl. 277—95)

ABSTRACT OF THE DISCLOSURE

A seal for use between relatively rotatable members such as generally on a rock bit body and a cutter mounted thereon for rotation relative thereto. It includes at least a pair of spring disks of the Belleville type embedded in a rubber-like material to which they are bonded and wherein the rubber-like material has sealing surfaces for engaging the bit body and cutter respectively, the spring disks being of a thin resilient material adapted to flex under pressure between the relatively rotatable parts to be sealed to maintain the rubber-like material in sealing engagement, the thinness of the disks substantially eliminating metal fatigue occurring where a single thicker disk is used, and the provision of two or more disks providing sufficiently strong spring action. The disks may be separated by the rubber-like material or by suitable plastic antifriction spacers.

Disclosure

This invention relates to improvements in seals between relatively rotating members. It is particularly useful in sealing the bearings of rotary rock bit cutters, but may be used to advantage on other relatively rotating members which are subject to analogous conditions.

Explanatory of the present invention, rotary rock bits have heretofore been provided consisting of a bit body from which legs extend downwardly. These legs have downwardly and inwardly extending journals, on which rotary cutters are rotatably mounted. Frequently, antifriction bearings are interposed between the journals and the cutters, and sometimes friction bearings between the journals and cutters are also employed. Lubricant is introduced into the bearings at the time of assembly and frequently, there is a lubricant reservoir in or associated with each leg in which a small amount of lubricant is kept that is continuously fed to the bearings between the journals and the cutters. During use of the bit, the bit is usually submerged in a mud laden liquid, and small cuttings are flushed upwardly by the circulation fluid that is discharged through circulation ports in the bit body. During the use of the bit, the bearings are apt to become worn so that some axial movements, radial movements, or wobbling of the cutters relative to the journals may occur. These movements are apt to develop a type of pumping action tending to expel lubricant from the interior of the cutters during one pulse and to draw in the surrounding well fluid during a succeeding pulse. If the cutting laden well fluid is allowed to carry cuttings into the antifriction bearings between the journals and the cutters, the life of the bit is materially shortened. To prevent this, it has heretofore been proposed to employ seals between the upper or outer end faces of the cutters and circular faces which surround the journals. Such seals have frequently been in the form of metallic Belleville springs coated with rubber or rubber-like compositions and presenting annular pads or flanges adjacent their inner and outer edges. One pad of the seal bears against the end face of the cutter, and the other pad of the seal bears against the annular face on the leg of the bit body that surrounds the journal. The seal in its initial or relaxed condition has a greater axial dimension than the axial distance between the opposed faces on the cutter and on the leg surrounding the journal. In the course of assembly, the seal is axially compressed so that the metal core or metal Belleville spring within the rubber coating is stressed. The stress of the metal core or Belleville spring keeps the rubber pads or flanges pressed against their respective surfaces on the cutter and on the leg.

If the metal core or Belleville spring is in the nature of a relatively thick dish shaped washer, the stresses developed near the edge thereof become quite high when the seal is axially compressed. Consequently, due to the high peripheral stress developed in the edges, fatigue may quickly occur resulting in the seal losing its sealing effectiveness. To correct this, it has heretofore been proposed to radially slit the metal core or Belleville spring inwardly from its outer edge. Sometimes, the inner ends of the slits terminate in circular perforations formed through the metal of the core or spring. This, in effect, divides the outer portion of the spring into a plurality of radially extending spring fingers, which may be flexed independently of each other. Such a construction, however, has not proven satisfactory due to the fact that the fingers weaken near their bases or at the inner ends of the fingers and break off after a relatively short period of use. Another proposal has been to corrugate the metal of the core of the seal with corrugations which extend radially. These corrugations were intended to permit the outer edge of the core to expand circumferentially by merely bending the corrugations and to allow the inner edges of the core to contract by bending the corrugations when the seal was axially compressed. Seals having corrugated metal cores have had some degree of success, but still are subject to certain disadvantages particularly when the metal of the core must be made reasonably thick in order to maintain the desired load on the rubber pads or flanges that bear against the sealing surfaces.

The primary object of the present invention is to provide an improved seal of the above described character wherein the metal core or spring that forms the interior of the seal instead of being formed of a metallic ring or washer of single thickness is in effect a laminated structure formed of two or more of metal layers. Each layer of metal is made of a metal that is quite thin, and because of its thin dimension, the stresses tending to fatigue the metal adjacent a periphery thereof can be materially reduced. The reduction in such stresses will serve to prolong the life of the seal against fatigue. More than one of such springs is required to provide the desired sealing pressure.

Another object of the invention is to provide a seal of the above described character wherein the metal elements or laminations that provide the axially compressible spring for the seal are separated from each other by antifriction spacers so that each metallic element is capable of readily working relative to other elements within the surrounding cover.

With the foregoing and other objects in view, which will be manifest in the following detailed description and specifically pointed out in the appended claims, reference is made to the accompanying drawing for an illustrative embodiment of the invention, wherein:

FIGURE 1 is a partial view in vertical section of a portion of a roller rock bit, illustrating a typical situation wherein the improved seal may be employed.

FIGURE 2 is a partial view in vertical section illustrating one form of seal embodying the present invention.

FIGURE 3 is a view similar to FIGURE 2 but illustrating another form of seal embodying the present invention.

FIGURE 4 is a partial view in vertical section through still another form of seal which may be employed.

Referring to the accompanying drawings, wherein similar reference characters designate similar parts throughout, those familiar with the rock bit art will recognize in FIGURE 1 a bit body 10 from which a leg 11 extends downwardly that terminates in a downwardly and inwardly inclined journal 12 on which a rotary rock bit cutter 13 is rotatably mounted. Usually, antifriction bearings are employed between the cutter 13 and the journal 12. Roller bearings are indicated at 14 and a ball bearing is indicated at 15. The ball bearing 15 is usually introduced through the journal by means of a ball opening 16 that is ultimately largely closed by a ball plug 17 which is welded in place such as by the weld 18. In addition to the roller and ball bearings, there may be friction bearings indicated at 19 and 20 between the cutter and the journal 12. 21 indicates a lubricant reservoir in which there is a movable diaphragm 22 that is subject to pressure on its top. Equivalent to the ambient fluid pressure existing in wall around the bit and which is conducted thereto through passages 23. The lubricant in the lubricant reservoir 21 is conducted around the neck 24 in the ball plug 17 to a passage 25 in the journal and is thus supplied to the bearings between the journal 12 and the cutter 13.

The seal 36 embodying the present invention is an annular spring ring disposed upwardly and outwardly of the roller bearing 14 and occupies a position between the end of the cutter 13 and continuously about an annular surface on the leg that surrounds the base of the journal 12. This seal 36 is intended to largely confine the lubricant in the bearings, although a small amount of escape of lubricant is permissible and frequently highly desirable. On the other hand, it is highly important that the seal serve to exclude the inclusion of cutting laden mud which would materially shorten the life of the antifriction bearings. Frequently, the opposed surfaces on the end of the cutter 13, and on the leg 11 surrounding the journal 12, are not only parallel to each other, but are arranged in planes perpendicular to the longitudinal central axis of the journal as depicted in FIGURE 3. However, my preferred arrangement is that which is disclosed in my prior U.S. Patent No. 3,096,835 issued July 9, 1963 wherein the opposed surfaces 26 and 27 on the cutter and leg, respectively, are arranged substantially parallel to each other, but in planes having an angular relationship to the perpendicular to the longitudinal central axis of the journal 12. Such an arrangement enables me to increase the length of the roller bearing 14 to advantage. The seal of the present invention, however, may be used regardless of whether the surfaces 26 and 27 are on the cutter and leg, respectively, are as depicted in FIGURE 2 or are in planes at right angles to the axis of the journal as depicted in FIGURE 3.

The seal embodying the present invention consists of what may be termed an annular laminated spring core. This spring core consists of preferably two or more dished spring washer-like elements indicated at 28, 29 and 30. These elements are formed of spring steel or equivalent springy material. They are quite thin, usual thickness being in the neighborhood of 0.01″ in the case of the usual rock but, although they are also highly effective if made thinner. They are disposed in what may be regarded as a nested relationship to each other and are spaced from each other by spacers 31 and 32. They may be formed of polytetrafluorethylene which has become known by the trade name "Teflon." This material is desirable on account of its antifriction properties between the metal springs 28, 29 and 30. Other antifriction spacers such as brass washers might be employed.

The core composed of the spring members 28, 29 and 30 together with the intervening polytetrafluorethylene spacers 31 and 32, is preferably encapsulated in rubber or a rubber-like composition, preferably bonded by heat to the spring washer-like elements. The rubber need not completely enclose the core, although this is preferable, due to the simplicity of manufacture. At all events, the seal should be equipped with annular pads or flanges 33 and 34 which bear against the surfaces 27 and 26, respectively, which preferably also are bonded to the spring members 28, 29 and 30.

It has also been found that a highly desirable and efficient seal can be made by not only encapsulating the spring members 28, 29 and 30 in rubber as shown in the drawing, but also in using rubber at 31′ and 32′ in place of the polytetrafluoroethylene spacers 31 and 32. The polytetrafluoroethylene does have peculiar anti-friction properties. However, where rubber is used between as well as around the spring disks, the separating and the encapsulating rubber is heat bonded to the disks and the inherent resiliency of the rubber permits the desired flexing of the disks without effecting the bond between the rubber and the metal. Under some condition of movement of the seal, the separating rubber, even though bonded to the disks, will permit movement of one disk relative to the other in a plane generally coincident with the plane of the disk, the resiliency of the rubber permitting such movement.

It will be understood that the overall axial thickness of the seal, when the seal is in its relaxed or initial condition, is greater than the spacing between the surfaces 26 and 27. In the course of assembly of the bit when the cutter is thrust onto the journal 12, the seal is axially compressed into the condition shown in FIGS. 2 and 3. In these conditions, the elements of the core are flatter than they would be if the seal were unstressed or in a relaxed condition.

The rubber may also extend across the inner edges of the spring elements 28, 29 and 30, as illustrated in FIG. 2. This rubber portion indicated at 35, may fit around the hub 37 at the base of the journal 12 with a press fit or an interfering fit tending to hold the seal against rotation sympathetically with the cutter 13. It is not essential, however, that the seal be held against rotation relative to the journal 12. Rotation of the seal may be permitted, although it is frequently desirable to have it retarded with relation to the rotation of the cutter. The deformability of the portion 35 of the rubber enables the seal to float radially to a limited extent in accommodating itself to radial or wobbling movement of the cutter relative to the journal 12 when the bearings become worn and permit such movements to take place. In some instances, it is desirable to hold the seal against floating or radial movements relative to the journal 12, in which case the spring elements 28, 29 or 30, or all of them may be extended as is illustrated at 28 in FIGURE 2 so that its inner edge is exposed on the interior of the rubber portion 35. Also as shown in FIGURE 4, the rubber at the outer edge of the seal may be extended so as to completely enclose the outer edges of the spring elements 28, 29, and 30 instead of leaving an edge of one or more spring elements such as 30 exposed as illustrated in FIGURES 2 and 3.

By reason of the fact that the dished or Belleville spring elements 28, 29, and 30 are made extremely thin, such as 0.011″ the stress at either periphery of the elements when axially compressed or loaded is considerably reduced. Consequently, it is unnecessary to perforate the spring elements or to radially slit them from their outer edges inwardly or to corrugate them with radially extending corrugations. A formula for calculating stress conditions in a Belleville spring is as follows:

$$S = \frac{Ef}{(1-\sigma^2)Ma^2}\left[C_1\left(h-\frac{f}{2}\right)+C_2 t\right]$$

where $S$ = stress at inside circumference
$E$ = modulus of elasticity of metal spring
$\sigma$ = Poisson's ratio = 0.3 for steel
$M$, $C_1+C_2$ = are constants taken from published data usually in chart form
$f$ = deflection in inches
$h$ = free height minus thickness in inches $a$ = ½ of outside diameter in inches
$t$ = thickness in inches If the spring elements have a thickness of 0.01" the deflection $f$ equals 0.025 the outside diameter of the ring is 3.037" its inside diameter is 2.327" the formula above stated calculates out as follows:

$$S = \frac{30{,}000{,}000 \times 0.025}{(0.910)(0.392)(2.30584)} \; 1.04568(0.093 - 0.0125) + 1.09410 \times 0.010$$

$$S = \frac{750{,}000}{0.82254} \; 0.08417 + 0.010941$$

$$S = \frac{750{,}000 \times 0.095111}{0.82254}$$

$$S = \frac{71{,}332}{0.82254}$$

$$S = 86{,}722 \text{ p.s.i.}$$

Such a stress loading considering the deflection is not such an excessive character as to cause any of the elements 28, 29, or 30 to suffer because of fatigue. However, as the thickness of the spring element enters into the formula as an important factor, it will be appreciated that if a single spring element having three times the thickness of the spring elements 28, 29, and 30 were employed, the peripheral stress near the edge of the single ring would be materially greater and would result in fatigue under otherwise identical conditions. Each spring element 28, 29, and 30 should, therefore, be kept as thin as is reasonably possible. Their effects in urging the pads or flanges 33 and 34 against their respective surfaces 27 and 26 may be regarded as additive to each other or accumulative and cause the pads to press against the surfaces 27 and 26 with the required effort to keep the bearings between the cutter and the journal 12 free of extraneous matter that might be introduced from the ambient flushing fluid. As the spring elements 28, 29, and 30 are all separated from each other by antifriction spacers 31 and 32 they may all be deformed or deflected independently from each other without influence of one by the other.

While the spacers 31 and 32 are preferably formed of antifriction material, such as Teflon, these spacers can be formed of rubber-like material, bonded to the disks between and completely about and may even be of the same material as the external covering.

Illustrative of the nature of the improvement made are the following results of camparative tests made in the laboratory. A Belleville spring having a thickeess of 0.028" and which was corrugated with radially extending corrugations and which was shotpeened prior to being covered with rubber-like material, was subjected to an axial load until it collapsed. The collapse load of the spring was 130 lbs. Four of these spring were subjected to fatigue tests wherein they were deformed from 0.030" to 0.075" deformation per cycle. These seals averaged a fatigue life of less than 100,000 cycles.

By way of comparison, three uncorrugated and unpeened springs, each having a thickness of 0.010" nested together and separated by Teflon spacers and covered with rubber-like material were subjected to the same type of axial collapse load. Their combined collapse load was 170 lbs. indicating a higher sealing ability. The latter seal was also subjected to the same type of fatigue test and found to be in excess of 400,000 cycles indicating that the ability of the improved seal to withstand fatigue was approximately four times as great. Thus, with the improved seal not only is a greater collapse load available, but the ability to withstand fatigue increases remarkably.

Various changes may be made in the details of the construction without departing from the spirit and scope of the present invention as defined by the appended claims.

I claim:

1. The combination of a seal between two relatively rotatable members, each of said members having an end wall, said seal comprising at least a pair of nested and aligned truncated spring disks, each of which in its released condition has its outer edge exially displaced with relation to its inner edge, anti-friction spacers between adjacent spring disks, said spring disks being adapted to become loaded by the application of one or more axial forces tending to bring the outer and inner edges of each disk into the same plane, and a rubber-like material on the outer sides of said spring disks, said rubber-like material encapsulating said spring disks and said spacers and providing oppositely disposed sealing surfaces in sealing engagement with the end walls of said members.

2. A seal for use in a well drilling bit between opposed faces of parts, one of said parts being rotatable relative to the other part, said seal comprising at least a pair of nested and aligned truncated sprink disks, each of which in its released condition has its outer edge axially displaced with relation to its inner edge, anti-friction spacers between adjacent spring disks, said spring disks being adapted to become loaded by the application of one or more axial forces tending to bring the outer and inner edges of each disk into the same plane, and a rubber-like covering enclosing said spring disks and spacers, said covering providing annular pads adjacent the outer and inner edges of the disks, respectively, extending axially from one side adjacent the outer edges of the disks and from the opposite side adjacent the inner edges of the disks, said pads sealingly engaging said opposed faces of said parts.

3. The structure in claim 2, and said rubber-like covering being extended inwardly between said spring disks and being bonded to facing surfaces of said disks.

References Cited

UNITED STATES PATENTS

| | | | |
|---|---|---|---|
| 3,096,835 | 7/1963 | Neilson | 277—95 X |
| 3,107,905 | 10/1963 | Lucas | 267—1 |
| 3,137,508 | 6/1964 | Cunningham | 277—95 |
| 3,147,961 | 9/1964 | Kowalski | 267—1 |

LAVERNE D. GEIGER, *Primary Examiner.*

J. MEDWICK, *Assistant Examiner.*